United States Patent
Matsuyama

(10) Patent No.: US 6,639,699 B2
(45) Date of Patent: Oct. 28, 2003

(54) OPTICAL SYSTEM FOR RECORDING OR REPLICATING HOLOGRAM

(75) Inventor: Tetsuya Matsuyama, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 09/859,806

(22) Filed: May 16, 2001

(65) Prior Publication Data

US 2002/0003638 A1 Jan. 10, 2002

Related U.S. Application Data

(62) Division of application No. 09/256,679, filed on Feb. 23, 1999, now Pat. No. 6,292,279.

(30) Foreign Application Priority Data

Feb. 25, 1998 (JP) ............................................. 10-043592
Feb. 25, 1998 (JP) ............................................. 10-043594

(51) Int. Cl.[7] ................................................. G03H 1/04
(52) U.S. Cl. ............................ 359/35; 359/10; 359/27; 359/28; 359/22
(58) Field of Search ............................. 359/35, 10, 27, 359/28, 1, 24, 22, 32

(56) References Cited

U.S. PATENT DOCUMENTS 5,162,929 A  * 11/1992 Roddy et al. ................. 359/17
5,255,252 A    10/1993 Katayama ..................... 369/44
5,339,305 A     8/1994 Curtis et al. ................... 359/3
5,923,418 A     7/1999 Clark et al. ................. 356/153

FOREIGN PATENT DOCUMENTS

JP        07-160183    *  6/1995  .................. 359/27

* cited by examiner

Primary Examiner—John Juba
Assistant Examiner—Fayez Assaf
(74) Attorney, Agent, or Firm—Dellett and Walters

(57) ABSTRACT

The invention provides a hologram recording or replicating optical system wherein a misalignment-with-time of the center of a laser generated beam is automatically corrected so that the color balance in a color hologram surface, for instance, can be well maintained with no disturbance. In the hologram recording or replicating optical system for irradiating a photosensitive material 20 with a beam from a laser 31 through a pinhole 10, a beam position correcting mechanism 32 and a beam splitter 33 are located in an optical path between the laser 31 and the pinhole 10, and a laser beam position detector 35 is located at a position in an optical path split by the beam splitter 33 and conjugate to the pinhole 10, so that the beam position correcting mechanism 32 can be operated on the basis of a beam position error signal obtained from the laser beam position detector 35 to keep the position of the beam incident on the pinhole 10 always constant.

3 Claims, 7 Drawing Sheets

US 6,639,699 B2

OPTICAL SYSTEM FOR RECORDING OR REPLICATING HOLOGRAM

This is a divisional of application Ser. No. 09/256,679, filed on Feb. 23, 1999, now U.S. Pat. No. 6,292,279.

BACKGROUND OF THE INVENTION

The present invention relates generally to an optical system for recording or replicating holograms. More specifically, the present invention relates to a hologram recording or replicating optical system capable of preventing misalignment of the center of a laser generated beam with the passage of time, which may otherwise disturb a color balance in a color hologram surface, and a multicolor hologram recording or replicating optical system which can prevent a variation of the color balance in a multicolor hologram surface, which is caused by a laser beam diameter difference for each color.

So far, R (red), G (green) and B (blue) full-color hologram has been recorded by means of an optical system as typically shown in FIG. 6 that illustrates an example of recording a full-color Lippmann hologram (reflection hologram). In this example, a photosensitive material 20 such as a photopolymer is used with light sources, an R laser 1 (e.g., 647-nm Kr laser), a G laser 2 (e.g., 576-nm dye laser) and a B laser 3 (e.g., 458-nm Ar laser). To synthesize laser beams from these lasers into one optical path, a total reflecting mirror 4 and dichroic mirrors 5 and 6 are used. In the illustrated arrangement, the dichroic mirror 5 is a red narrow-band mirror having a non-reflective coating on its back surface, and the dichroic mirror 6 is a mirror that has a non-reflective coating on its back surface and selectively reflects only light having a wavelength of 500 nm or greater. The lasers 1 to 3 are not necessarily located according to the illustrated layout, and so may be located at different positions. In this case, however, it is required to alter the positions and reflection bands of the total reflecting mirror 4 and dichroic mirrors 5 and 6.

Light coming from the RGB three-colors lasers 1 to 3 and synthesized through the total reflecting mirror 4 and dichroic mirrors 5 and 6 is split by a half-mirror 7 into two ray bundles, one of which is focused through a mirror 8 and a lens 9 to a pinhole 10. Divergent light leaving the pinhole 10 is obliquely incident on one side of the photosensitive material 20. On the other hand, the other ray bundle is focused through mirrors 11 and 12 and a lens 13 to a pinhole 14. Divergent light leaving the pinhole 14 is incident on the other side of the photosensitive material 20. Then, both divergent ray bundles interfere with each other in the photosensitive material 20, so that the hologram of an object illuminated with the divergent light leaving the pinhole 14, for instance, can be recorded therein.

For instance, to use a RGB primary-colors full-color hologram plate thereby replicating a similar hologram therefrom, such an optical system as shown in FIG. 7 is used. In the FIG. 7 embodiment, a full-color Lippmann hologram (reflection hologram) is replicated as an example. As replicating illumination light sources, an R laser 1, a G laser 2 and a B laser 3 are used as in FIG. 6. Laser light rays from these are synthesized through a total reflecting mirror 4 and dichroic mirrors 5 and 6 into one optical path. The thus synthesized RGB three-colors laser light from the lasers 1 to 3 is focused through a lens 9 to a pinhole 10. Divergent light leaving the pinhole 10 is incident on a photosensitive material 20 brought in close contact with a hologram plate 21 with an index-matching liquid filled between them. Then, the incident light and diffracted light from the hologram plate 21 interfere with each other in the photosensitive material 20, so that a color hologram having the same properties as those of the hologram plate 21 can be replicated.

When a multicolor hologram such as a full-color hologram is recorded or replicated with such a recording or replicating optical system as mentioned above, the color balance is well kept at the start of recording or replication. On completion of recording or replication, however, there is a problem that the color balance is disturbed.

Two or more laser beams are used for the recording, and replication of multicolor holograms as shown in FIGS. 6 and 7. However, the hues or tints of reconstructed images vary depending on the intensity ratio of laser light on the surface of the photosensitive material.

Although the color balance is well maintained at the start of recording or replication, it suffers from disturbance on completion of recording or replication, as already mentioned. The reason is that the distribution of each laser exposure intensity in the hologram surface varies during recording or replication, and so the ratio of each laser light intensity varies at each point in the hologram surface. The exposure intensity is strongest at the center of the optical axis of a laser beam, and becomes weak farther off the center. In other words, the change of the exposure intensity distribution in the hologram surface is tantamount to a deviation of the center of the optical axis of the laser beam from a given position. As holograms are actually recorded or replicated for a long period of time, for instance, one day or 12 hours, the center of a laser beam deviates from the center of the exposed surface. This appears to be due to the superposition of various reasons such as temperature changes.

Until now, this problem has been solved by manually measuring the exposure intensity distribution on the exposed surface, and then manually correcting the angle of each mirror in the optical system based on the measurement.

With this method, however, much time is needed for one regulation. Further, the exposure intensity distribution cannot be measured during, and simultaneously with, recording or replication.

Another problem with the recording or replication of a multicolor hologram such a full-color hologram using such a recording or replicating optical system as mentioned above is that there is a difference in the hues or tints of a reconstructed image between the central portion and the peripheral portion of the hologram surface. Such hue or tint variations on the hologram surface result from the rate of intensity decrease varying from the center to the periphery of each laser beam. Even when a hologram is recorded or replicated while the laser light of each color is balanced at the center of a photosensitive material, therefore, the balance suffers from disturbance at the periphery portion of the photosensitive material.

As already described, the fact that the rate of intensity decrease varying from the center to the periphery of each laser beam is due to a beam diameter difference between laser beams. A beam having a large diameter diverges Ad widely with the rate of intensity decrease with respect to the distance from the center becoming small. This is in contrast to a beam having a small diameter.

So far, this problem has been solved not only by making exposure intensity at the center of the photosensitive material uniform but also by measuring exposure intensity at the central and peripheral portions of the exposure surface to find the maximum intensity balance at the central and peripheral portions of the exposed surface.

With this method, however, much time is needed because several measurements should be obtained in one regulation. As the exposure surface becomes wide, there is a large hue or tint difference between the central and peripheral portions of the exposed surface. According to this method, the hues or tints thus change unavoidably more or less in the surface.

SUMMARY OF THE INVENTION

The present invention is achieved in view of such problems with the prior art as mentioned above. It is therefore one object of the invention to provide a hologram recording or replicating optical system which can make automatic correction for misalignment of the center of a laser generated beam with the passage of time, so that, for instance, the color balance in a color hologram surface can be well maintained.

Another object of the present invention is to provide a multicolor hologram recording or replicating optical system capable of preventing a color balance variation in a hologram surface, which is caused by a difference in diameter between a plurality of laser beams used upon synthesis.

According to one aspect of the invention, the above objects are achieved by the provision of an optical system for irradiating a photosensitive material with a laser beam from a laser light source to record or replicate a hologram therein, characterized in that a beam position correcting mechanism and a beam splitter are located at any position in an optical path between said laser light source and said photosensitive material and a laser beam position detector is located in an optical path split by said beam splitter, so that said beam position correcting mechanism can be operated on the basis of a beam position error signal obtained from said laser beam position detector, thereby keeping a laser beam position always constant.

In this aspect, it is preferable that in order from a laser light source side, the beam position correcting mechanism and the beam splitter are located in the optical path between the laser light source and the photosensitive material and the laser beam position detector is located in the optical path split by the beam splitter, so that the beam position correcting mechanism can be operated on the basis of the beam position error signal obtained from the laser beam position detector, thereby keeping the laser beam position always constant.

According to another aspect of the invention, there is provided a hologram recording or replicating optical system for irradiating a photosensitive material with a laser beam from a laser light source through a pinhole to record or replicate a hologram therein, characterized in that a beam position correcting mechanism and a beam splitter are located at any position in an optical path between said laser light source and said pinhole and a laser beam position detector is located at a position in an optical path split by said beam splitter and conjugate to said pinhole, so that said beam position correcting mechanism can be operated on the basis of a beam position error signal obtained from said laser beam position detector, thereby keeping a position of a laser beam incident on said pinhole always constant.

In this aspect, it is preferable that in order from a laser light source side, the beam position correcting mechanism and the beam splitter are located in the optical path between the laser light source and the pinhole and the laser beam position detector is located at a position in the optical path split by the beam splitter and conjugate to the pinhole, so that the beam position correcting mechanism can be operated on the basis of the beam position error signal obtained from the laser beam position detector, thereby keeping the position of the laser beam incident on the pinhole always constant.

In an embodiment of this hologram recording or replicating optical system where laser beams from a plurality of laser light sources are synthesized into one synthetic laser beam which is then incident on a pinhole, it is preferable that a beam position correcting mechanism, a beam splitter and a laser beam position detector are located between each laser light source and a beam synthesis optical system, so that a position of a laser beam incident from each laser light source on the pin hole can be kept always constant.

In the second aspect of the invention, the beam position correcting mechanism may comprise an angle-controllable mirror, an angle of which can be controlled around two axes intersecting at right angles and independently by means of actuators.

In the second aspect of the invention, the laser beam position detector may comprise four diodes proximately juxtaposed according to a 2×2 layout, so that a detection signal from two diodes in a upper row are added to a detection signal from two diodes in a lower row to generate a vertical misalignment signal for a laser beam on the basis of a difference signal between added signals, and a detection signal from two diodes in a left column is added to a detection signal from two diodes in a right column to generate a horizontal misalignment signal for a laser beam on the basis of a difference signal between added signals.

According to yet another aspect of the invention, there is provided a multicolor hologram recording or replicating optical system using one synthetic laser beam obtained by synthesis of laser beams from a plurality of lasers, characterized in that between at least one laser and a beam synthesis optical system there is located a beam expander for converting one laser beam to make a diameter thereof substantially equal to a diameter of other laser beam synthesized therewith.

In this case, beam expanders may be located between all the lasers and the beam synthesis optical system. Alternatively, when laser beams from N (a positive integer) lasers are synthesized, beam expanders may be located between N-1 lasers and the beam synthesis optical system.

In this aspect, a beam expander having a variable beam magnification ratio may be used as at least one beam expander.

According to the first, and second inventions, the beam position correcting mechanism and beam splitter are located at any position between the laser light source and the photosensitive material and the laser beam position detector is located in an optical path split by the beam splitter, so that the beam position correcting mechanism can be operated on the basis of a beam position error signal obtained from the laser beam position detector, thereby the position of the laser beam always constant. A deviation of the center of the optical axis of the laser deviates from a given position during recording or replication, if any, can thus be automatically corrected, so that, for instance, the color balance in the hologram surface can be well maintained.

According to the third aspect of the invention, a beam expander is located between at least one laser and a beam synthesis optical system so that the diameter of the laser beam from the laser can be made substantially equal to the diameters of other laser beams. It is thus possible to make the diameters of all laser beams equal to each other so that the rates of strength decrease from the centers to the peripheries of a plurality of laser beams. When a hologram is recorded or replicated while the intensity of laser light of each color is balanced at the center of the photosensitive material, this balance can be well maintained even at the periphery of the photosensitive material. Thus, the hues or tints of the reconstructed image on the central and peripheral portions of the recorded or replicated hologram surface remain substantially identical or unchanged.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1A:
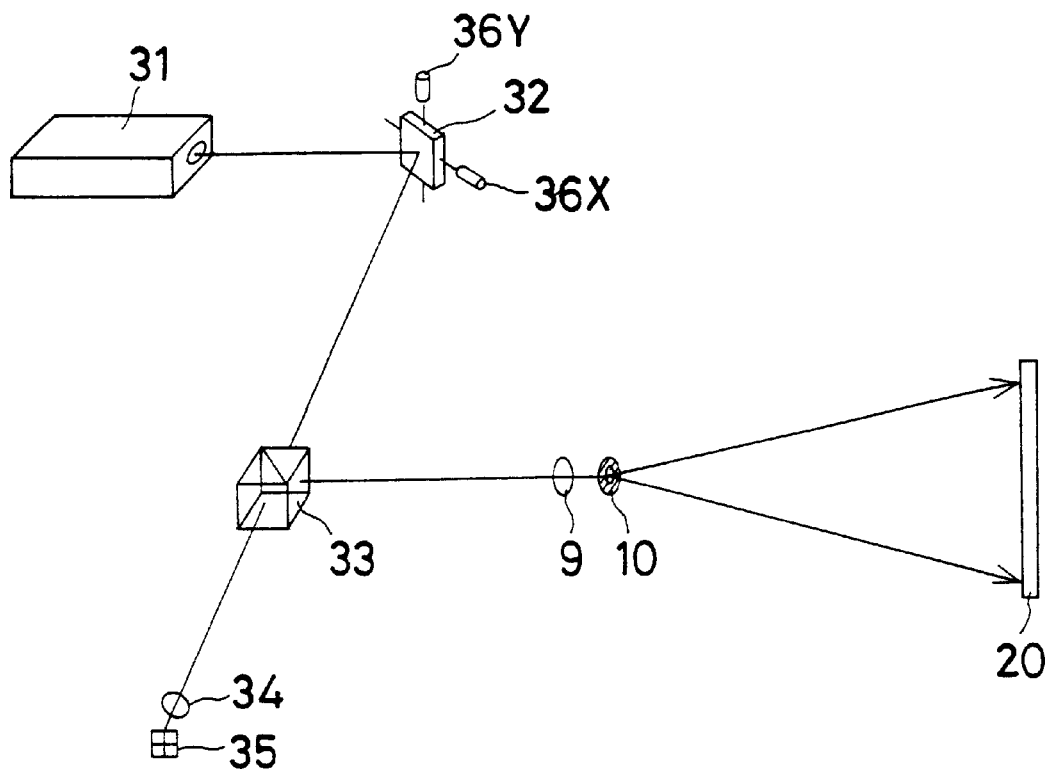
FIGS. 1(a) and 1(b) illustrate the construction of one embodiment of the hologram recording or replicating optical system according to the invention.
Figure 1B:
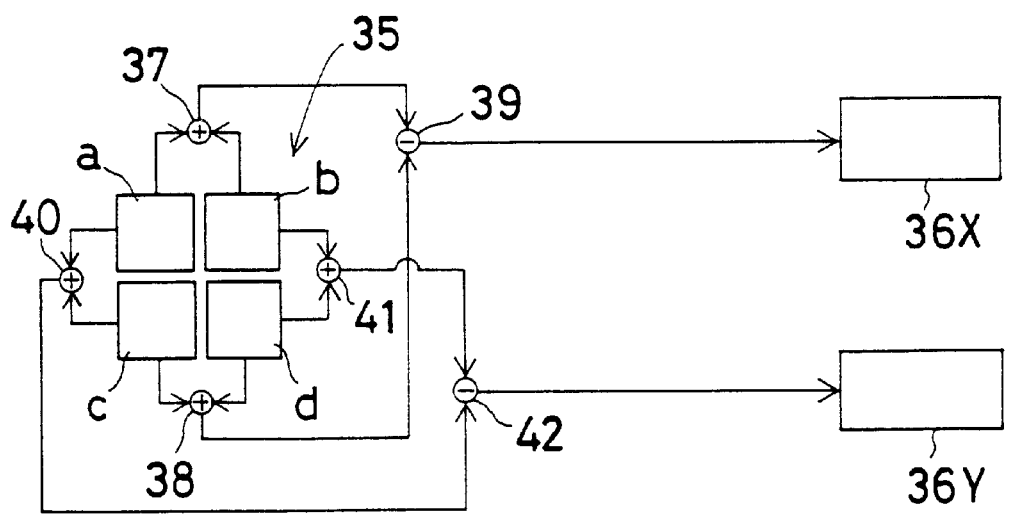
Figure 6:
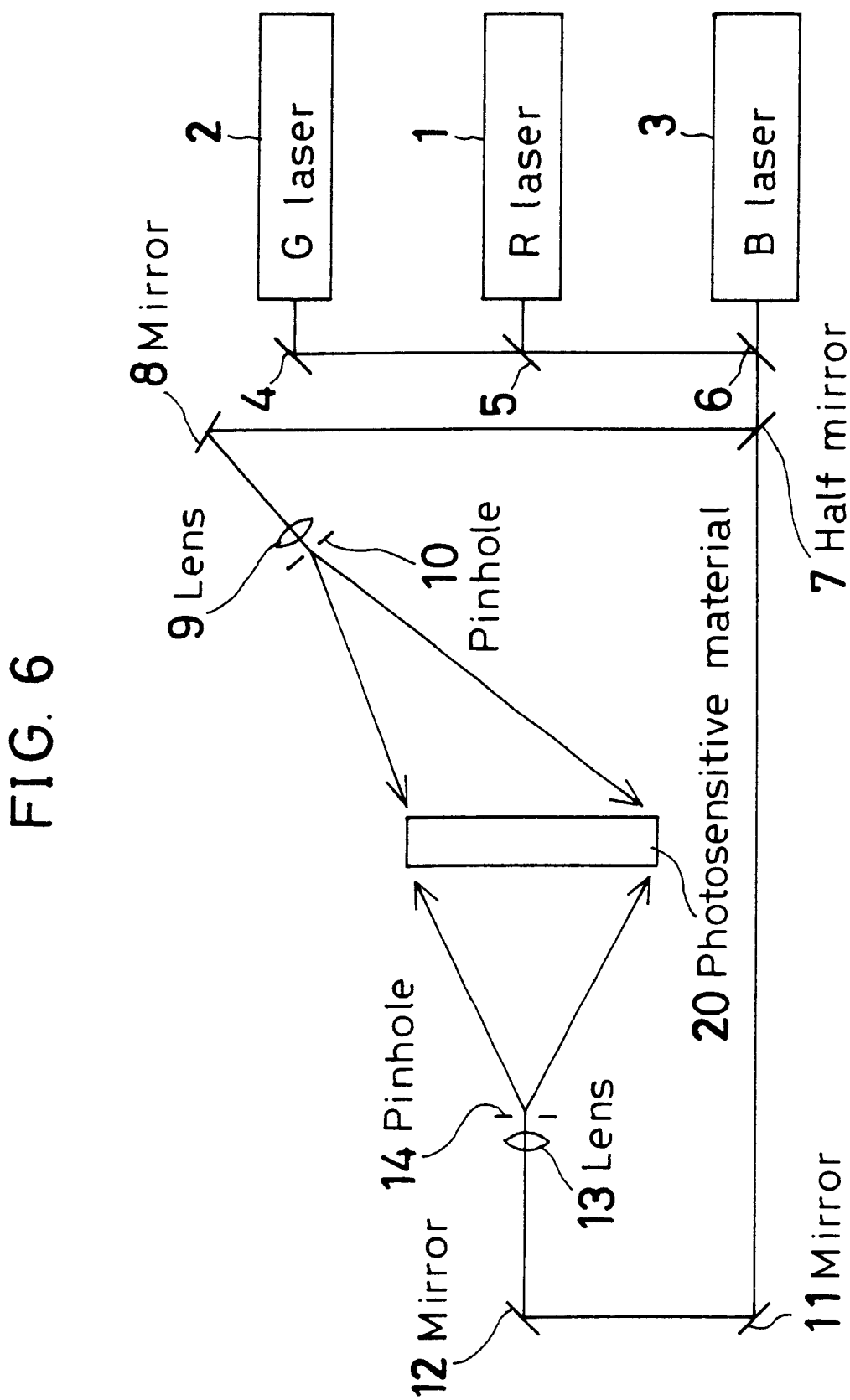
FIG. 6 is a schematic illustrating the construction of a full-color hologram recording optical system, to which the invention is applicable.
Figure 7:
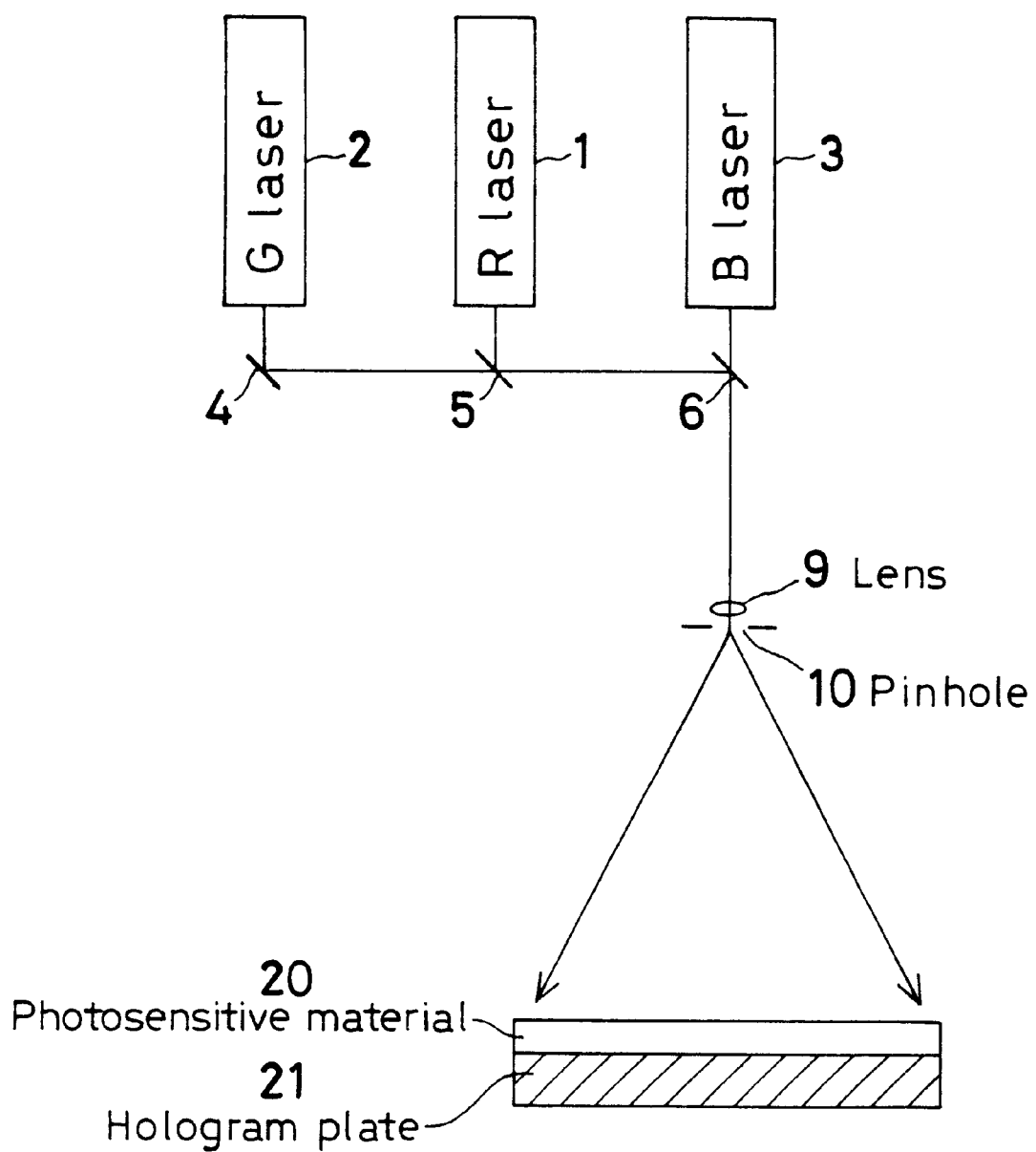
FIG. 7 is a schematic illustrating the construction of a full-color hologram replicating optical system, to which the invention is applicable.

FIG. 1(a) is a schematic illustrating the construction of one embodiment of the hologram recording or replicating optical system according to the invention, and FIG. 1(b) is a schematic for illustrating a beam position detector and a servo system. In the FIG. 1 optical system, a portion except a lens 9, a pinhole 10 and a photosensitive material 20 corresponds to a portion of the optical system shown in FIG. 6, and FIG. 7, i.e., an optical path located between the dichroic mirrors 5 and 6 for synthesizing beams from the lasers 1 to 3. A laser 31 corresponds to the lasers 1, 2 and 3.

In this optical system, a laser beam from the laser 31 is reflected at an angle-controllable mirror 32, the angle of which is controllable around two axes, a horizontal X axis and a Y axis perpendicular to the X axis, and independently by means of actuators 36X and 36Y, and is then incident on a beam splitter prism 33 where the laser beam is split into two beams. One of these beams is focused through the lens 9 to the pinhole 10. Upon leaving the pinhole 10, divergent light is incident on the photosensitive material 20 so that a color hologram can be recorded or replicated therein according to the layout shown in FIG. 6, and FIG. 7.

The other transmitted light split by the beam splitter prism 33 strikes on a beam position detector 35 through a lens 34.

The lens 34 is provided to locate the pinhole 10 and beam position detector 35 at optically conjugate positions.

As can be seen from FIG. 1(b), the beam position detector 35 is made up of four photodiodes a to d which are horizontally and vertically juxtaposed according to a 2×2 layout. Detection signals from the photodiodes a and b juxtaposed in an upper row are added in an adder 37, detection signals from the photodiodes c and d juxtaposed in a lower row are added in an adder 38, detection signals from the photodiodes a and c juxtaposed in a left column are added in an adder 40, and detection signals from the photodiodes b and d juxtaposed in a right column are added in an adder 41. An output signal from the adder 37 and an output signal from the adder 38 are subjected to subtraction in a subtracter 39, and an output signal from the adder 40 and an output signal from the adder 41 are subjected to subtraction in an subtracter 42.

In the thus constructed beam position detector 35, the output signal from the subtracter 39 is proportional to the amount of vertical deviation of the center of the laser beam at a position of incidence, which laser beam is incident on the beam position detector 35 through the beam splitter prism 33, and the output signal form the subtracter 42 is proportional to the amount of vertical deviation of the center of the laser beam at a position of incidence, which laser beam is incident on the beam position detector 35 through the beam splitter prism 33. In addition, the amount of this vertical, and horizontal deviation is the same as, or proportional to, the amount of deviation of the laser beam used for recording or replication at the position of the pinhole 10, because the beam position detector 35 is located at the position optically conjugate to the pinhole 10.

If, therefore, a driving signal proportional to the output signal from the subtracter 39 is entered into the actuator 36X for the angle-controllable mirror 32 and a driving signal proportional to the output signal from the subtracter 42 is entered into the actuator 36Y for the angle-controllable mirror 32, through a control circuit (not shown) in each case, to control the angle of the angle-controllable mirror 32 around the axes X and Y, it is then possible to achieve a servo mechanism that enables the center of the laser beam to align automatically with the center of the beam position detector 35, i.e., the center of the pinhole 10.

By using such a servo mechanism, the centers of the laser beams from the different three lasers 1 to 3 are automatically controlled so that they can be all in alignment with the center of the pinhole 10. Even when misalignment of the center of each laser generated beam occurs after the passage of some considerable time due to various reasons such as temperature changes, therefore, it can be automatically corrected, for instance, to ensure that the color balance in the color hologram surface can be well maintained.

Figure 2:
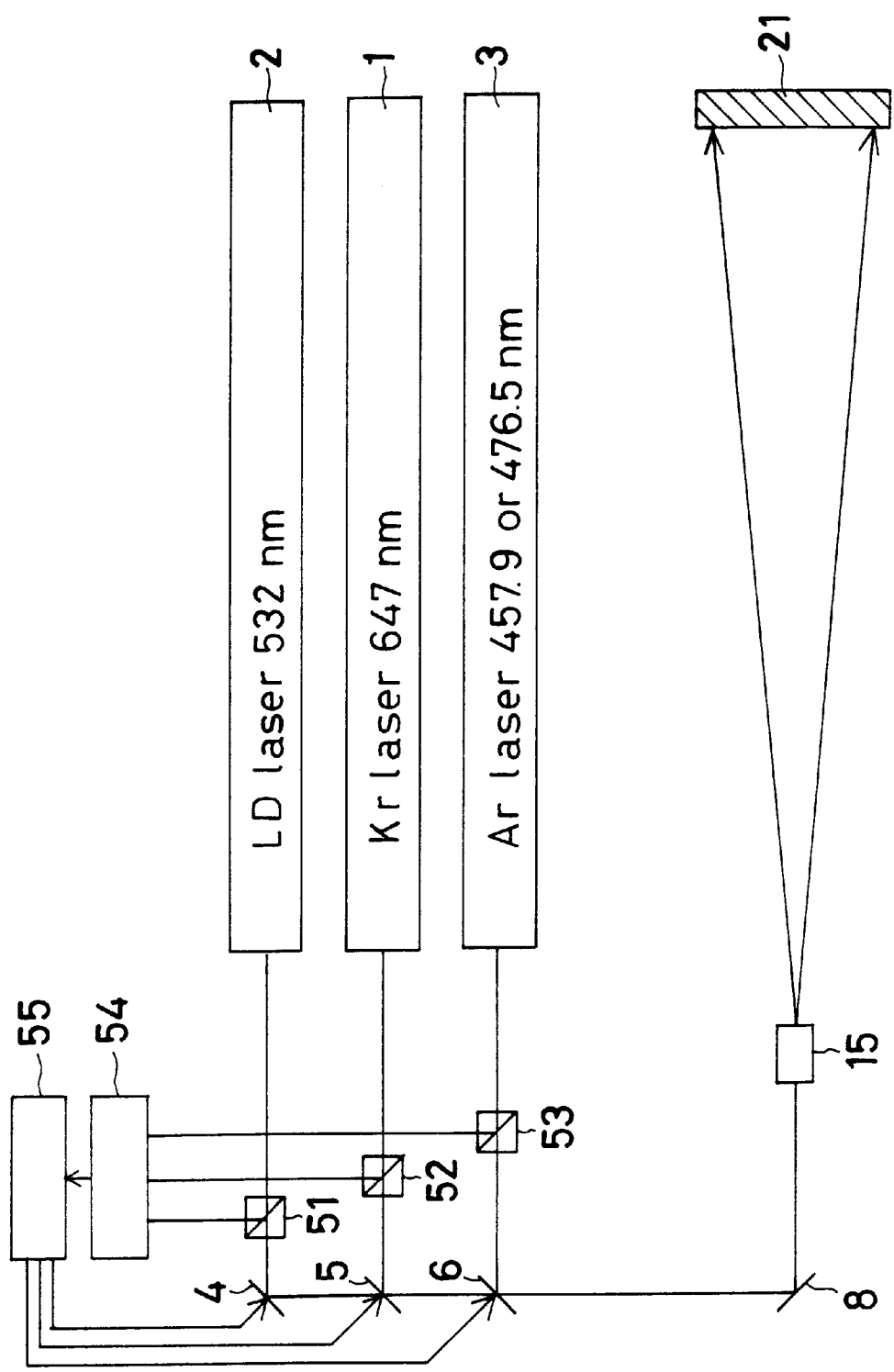
FIG. 2 is a schematic for illustrating the construction of another embodiment of the hologram recording or replicating optical system according to the invention.

In the foregoing embodiment, the beam position detector 35 is disposed in the optical path split by the beam splitter located downstream of the laser beam, and the beam position error signal obtained therefrom is fed back to the beam position correcting mechanism (angle-controllable mirror 32) disposed upstream of the laser beam so that the position of the laser beam can be kept always constant. According to the invention, however, feed forward control may also be feasible as shown in FIG. 2. In the FIG. 2 embodiment, an R laser 1 that is a Kr laser (of 647-nm wavelength), a G laser 2 that is an LD laser (of 532-nm wavelength) and a B laser 3 that is an Ar laser (of 457.9-nm or 476.5-nm wavelength) are used for replicating illumination light sources as in FIG. 4. Laser beams from these lasers are synthesized by a total reflecting mirror 4 and dichroic mirrors 5 and 6 into one optical path. The thus synthesized RGB three-colors light from the lasers 1 to 3 is diverged from a divergent optical system 15 through a mirror 8, said system 15 comprising a lens and a pinhole. The divergent light is incident on a photosensitive material brought in close contact with a hologram plate 21 with an index-matching liquid filled between them. Then, the incident light and diffracted light from the hologram plate 21 interfere with each other in the photosensitive material, so that a color hologram having the same properties as those of the hologram plate 21 can be replicated.

In this embodiment, beam splitters 51, 52, and 53 are located in optical paths for the G laser 2, the R laser 1, and B laser 3, respectively. Each laser beam split by each beam splitter then strikes on a beam position detector system 54. The beam position detector system 54, for instance, is made up of an array of three beam position detectors 35 as shown in FIG. 1(b), which correspond to three laser beams split by the beam splitters 51, 52 and 53. Three laser beam position detection signals from this beam position detector system 54 are entered into a personal computer 55.

The total reflecting mirror 4, and the dichroic mirrors 5 and 6 are each angle-controllable around X and Y axes by entrance of a position control signal as is the case with the angle-controllable mirror 32 shown in FIG. 1. Position control signals are entered from the personal computer 55 into these mirrors 4, 5, and 6.

Accordingly, deviations of each laser beam from the G laser 2, R laser 1, and B laser 3 from a given reference position in two perpendicular directions are detected in each beam position detector 35 in the beam position detector system 54 through the beam splitters 51, 52, and 53, and misalignment signals are entered into the personal computer 55. The personal computer 55 is preprogrammed regarding to what degree the angles of the mirrors 4, 5 and 6 should be regulated around the X and Y axes, corresponding to the detected misalignments. Thus, the personal computer 55 send A-position control signals for correction of beam misalignments separately to the mirrors 4, 5 and 6, thereby controlling the angles of the mirrors 4, 5 and 6 as required. In this way, each laser beam is automatically controlled to bring its center in alignment with the center of the pinhole in the divergent optical system 15. Even when misalignment of the center of each laser generated beam occurs after the passage of some considerable time due to various reasons such as temperature changes, therefore, it can thus be automatically corrected, for instance, to ensure that the color balance in the color hologram surface can be well maintained.

While the first, and second hologram recording or replicating optical systems of the invention have been explained with reference to specific embodiments, it is to be understood that the invention is in no sense limited thereto, and so many modifications may be made thereto. For the beam position detector, beam position correcting mechanism, feedback mechanism, feed forward mechanisms, etc., too, various known mechanisms may be used in addition to those explained above.

Figure 3:
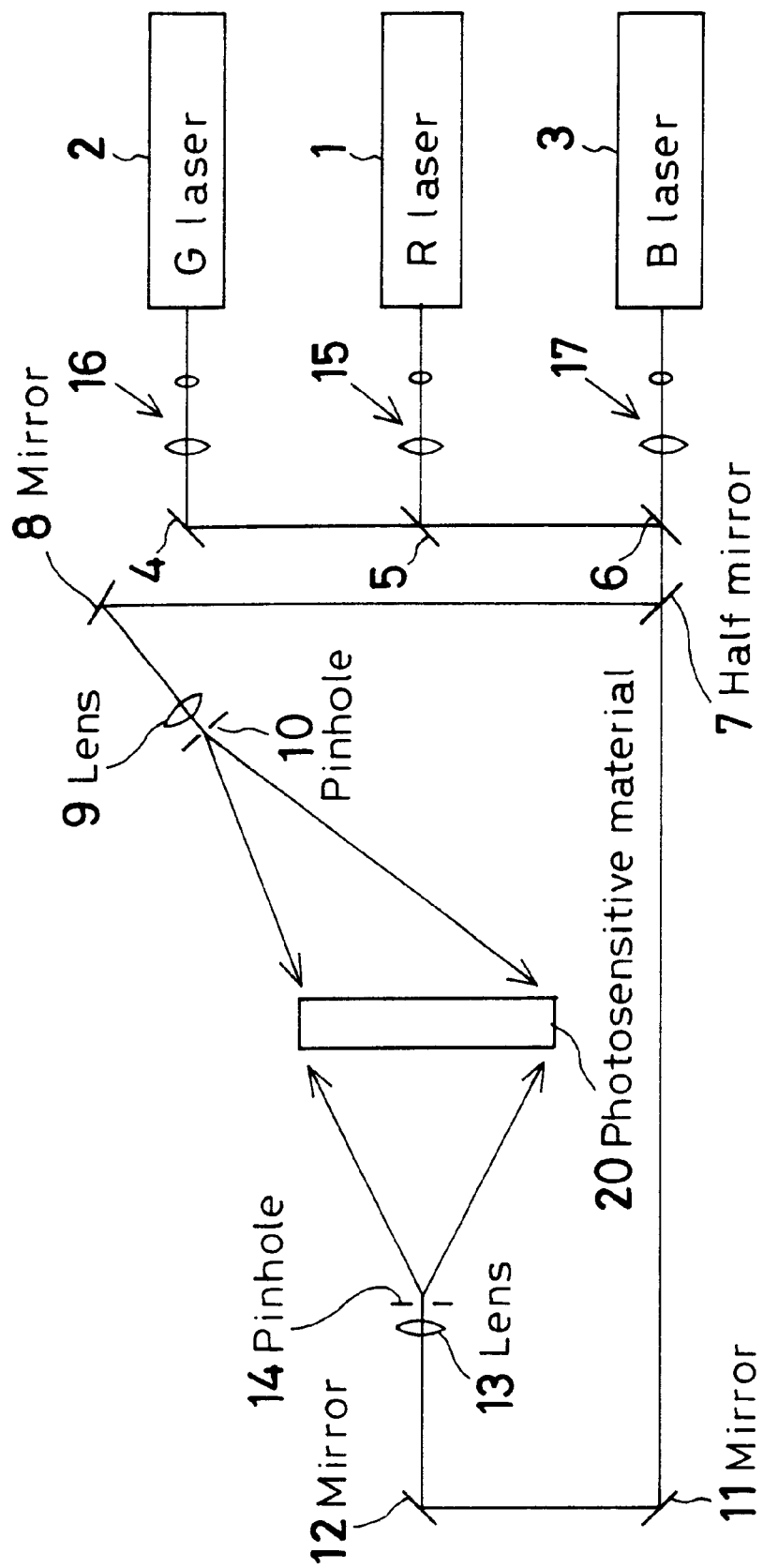
FIG. 3 is a schematic for illustrating the construction of one embodiment of the RGB full-color hologram recording optical system according to the invention.
Figure 4:
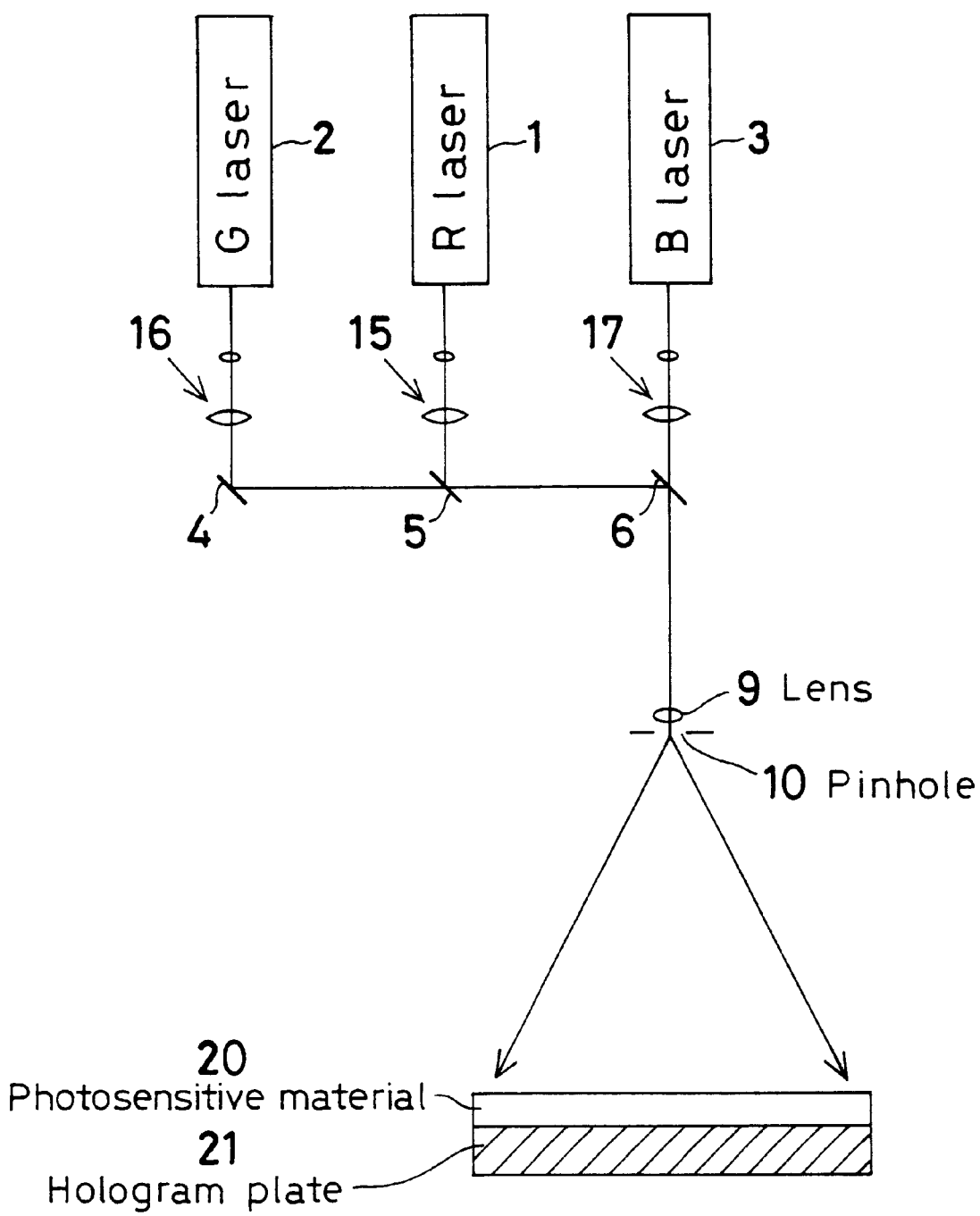
FIG. 4 is a schematic for illustrating the construction of one embodiment of the RGB full-color hologram replicating optical system according to the invention.

FIG. 3 illustrates the construction of an RGB full-color hologram recording optical system that is one embodiment of the third hologram recording or replicating optical system of the invention, and FIG. 4 illustrates the construction of an RGB full-color hologram replicating optical system that is another embodiment of the third invention. In each embodiment, a laser beam from a G laser 2 is guided through a total reflecting mirror 4 to a dichroic mirror 5, at which a laser beam from an R laser 1 is reflected and through which the laser beam from the G laser 2 is transmitted, so that the laser beam from the R laser 1 and the laser beam from the G laser 2 are synthesized. The synthesized laser beam is guided to a dichroic mirror 6, at which it is reflected and a laser beam from a B laser 3 is transmitted. In this way, the laser beams from the three lasers 1 to 3 are synthesized into an RGB laser beam.

In the FIG. 3 embodiment, light obtained by the synthesis of RGB three-colors laser beams is divided by a half mirror 7 into two ray bundles, as explained in the "prior art". One light is focused through a mirror 8 and a lens 9 to a pinhole 10, and divergent light leaving the pinhole 10 is obliquely incident on one side of a photosensitive material 20. The other light is focused through mirrors 11 and 12 and a lens 13 to a pinhole 14, and divergent light leaving the pinhole 14 is incident on the other side of the photosensitive material 20. Thus, both the divergent ray bundles interfere with each other in the photosensitive material 20, so that the color hologram of an object illuminated with the divergent light leaving the pinhole 14, for instance, can be recorded therein.

In the FIG. 4 embodiment, light obtained by the synthesis of RGB three-colors laser beams as mentioned above is focused through a lens 9 to a pinhole 10, and divergent light leaving the pinhole 10 is incident on a photosensitive material 20 brought in close contact with a hologram plate 21 with an index-matching liquid filled therebetween. This incident light and diffracted light from the hologram plate 21 interfere with each other in the photosensitive material 20, so that a color hologram having the same properties as those of the hologram plate 21 can be replicated.

In this embodiment of the invention, beam expanders 15, 16, and 17 are located at a position where the laser beam from an R laser 1 does not reach a dichroic mirror 5, at a position where the laser beam from a G laser 2 does not reach a dichroic mirror 4, and at a position where the laser beam from a B laser 2 does not reach a dichroic mirror 6, respectively. The beam magnification ratios (inclusive of reduction ratios) of the beam expanders 15, 16 and 17 are different from one another so that all the three laser beams can have the same beam diameter.

Figure 5A:
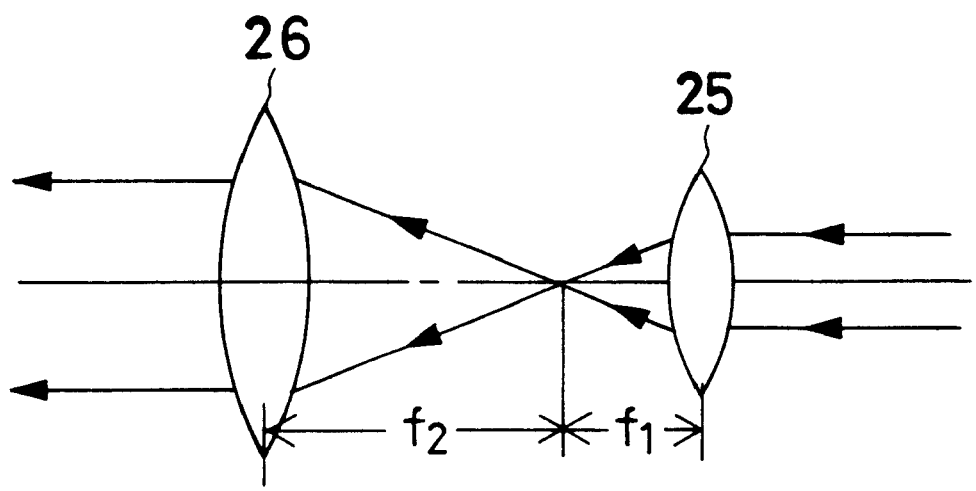
FIGS. 5(a) and 5(b) comprise a schematic illustrating the construction of a typical beam expander.
Figure 5B:
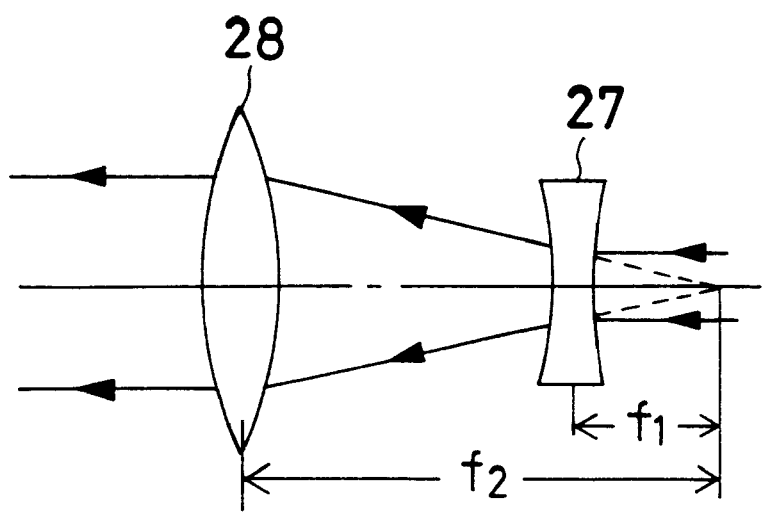

FIG. 5 illustrates two typical beam expanders usable for the beam expanders 15 to 17. Shown in FIG. 5(a) is a Keplerian type beam expander made up of two positive lens groups 25 and 26 located at a confocal point, and shown in FIG. 5(b) is a Galilean type beam expander made up to a negative lens group 27 and a positive lens group 28 located at a confocal point. In the FIG. 5(a) beam expander, beams from the lasers 1 to 3 are incident on the positive lens group 25, and focused once at a back focal position thereof. Then, divergent light from the focusing position leaves the positive lens group 26 in the form of parallel beams. The beam magnification ratio is given by $f_2/f_1$ where $f_1$ is the focal length of the positive lens group 25 and $f_2$ is the focal length of the positive lens group 26. In the FIG. 5(b) beam expander, beams from lasers 1 to 3 are incident on the negative lens group 27, and diverge from a front focal point thereof. The divergent light then leaves the positive lens group 28 in the form of parallel beams. The beam magnification is given by $f_2/f_1$ where $f_1$ is the absolute value of the focal length of the negative lens group 27 and $f_2$ is the focal length of the positive lens group 28. For the beam expanders 15 to 17, either one of the types shown in FIGS. 5(a) and 5(b) may be used.

Here let $D_R$, $D_G$, and $D_B$ stand for the diameters of laser beams from the R laser 1, the G laser 2, and the B laser 3, respectively, and let $\alpha_R$, $\alpha_G$, and $\alpha_B$ represent the magnification of the beam expander 15, the magnification of the beam expander 16, and the magnification of the beam expander 17, respectively. If the magnifications $\alpha_G$, $\alpha_R$ and $\alpha_B$ of the beam expanders 15 to 17 are determined in such a way as to satisfy the relation defined by $D_R \cdot \alpha_R = D_G \cdot \alpha_G = D_B \cdot \alpha_B$, all the diameters of the R, G and B laser beams to be synthesized are then equal, so that the rates of intensity decrease from the centers to the peripheries of the three laser beams can become equal. When a hologram is recorded or replicated while the intensity of laser light of each color is balanced at the center of the photosensitive material 20, this balance can be well maintained even at the periphery of the photosensitive material 20. Thus, the hues or tints of the reconstructed image on the central and peripheral portions of the recorded or replicated hologram surface remain substantially identical or unchanged.

When, for instance, $D_R=1.62$ mm, $D_G=1.68$ mm and $D_B=1.60$ mm, the magnifications of the beam expanders 15 to 17 should be $\alpha_R=1.85$, $\alpha_G=1.75$ and $\alpha_B=1.86$ so as to allow the beams to be synthesized to have a diameter of 3 mm.

When N laser beams with varying diameters are synthesized into a laser beam having a diameter equal to that of one of said N laser beams, it is then unnecessary to locate a beam expander in an optical path for said one laser beam or locate beam expanders in optical paths for all the laser beams. In other words, the object of the invention is achieved by locating beam expanders in N-1 laser beams. If n laser beams of N laser beams have nearly identical diameters, then beam expanders should preferably be located in optical paths for the remaining N-n laser beams.

For the beam expanders 15 to 17, it is preferable to use a beam expander of great versatility, which has a variable magnification and so can be regulated to a desired magnification for each beam. The beam expander with a variable beam magnification ratio is exemplified by an afocal zoom lens, wherein the value of $f_2/f_1$ is variable in such confocal relations as shown in FIG. 5(a) or 5(b). For instance, use may be made of an afocal zoom converter lens in a photographic objective.

While the hologram recording or replicating optical systems of the invention have been explained with reference to some preferred embodiments, it is to be understood that the invention is in no sense limited to such embodiments, and so many modifications may be made thereto.

As can be appreciated from the foregoing explanation, the hologram recording or replicating optical system comprises a beam position correcting mechanism and a beam splitter at any desired positions between a laser light source and a photosensitive material. A laser beam position detector is located in an optical path split by the beam splitter, so that the beam position correcting mechanism can be operated on the basis of a beam position error signal obtained from the laser beam position detector, thereby keeping the position of the laser beam always constant. A deviation from the center of the optical axis of the laser beam from a given position during recording or replication, if any, can be automatically corrected so that, for instance, the color balance in a color hologram surface can be well maintained with no disturbance.

According to the multicolor hologram recording or replicating optical system, a beam expander is located between at least one laser and a beam synthesis optical system so that the diameter of the laser beam from the laser can be made substantially equal to the diameters of other laser beams. It is thus possible to make the diameters of all laser beams equal to each other so that the rates of strength decrease from the centers to the peripheries of a plurality of laser beams. When a hologram is recorded or replicated while the intensity of laser light of each color is balanced at the center of the photosensitive material, this balance can be well maintained even at the periphery of the photosensitive material. Thus, the hues or tints of the reconstructed image on the central and peripheral portions of the recorded or replicated hologram surface remain substantially identical or unchanged.

What I claim is:

1. A multicolor hologram recording or replicating optical system using one synthetic laser beam obtained by synthesis of laser beams from a plurality of lasers, characterized in that between at least one laser and a beam synthesis optical system there is located a beam expander for converting one laser beam to make a diameter thereof substantially equal to a diameter of other laser beam synthesized therewith, characterized in that a beam expander having a variable beam magnification ratio is used as at least one beam expander.

2. The multicolor hologram recording or replicating optical system according to claim 1, characterized in that beam expanders are located between all lasers and said beam synthesis optical system.

3. The multicolor hologram recording or replicating optical system according to claim 1, characterized in that when laser beams from N, a positive integer, lasers are synthesized, beam expanders are located between N-1 lasers and said beam synthesis optical system.

* * * * *